United States Patent

Niederer et al.

(10) Patent No.: US 9,178,455 B2
(45) Date of Patent: Nov. 3, 2015

(54) CONTROL DEVICE AND METHOD FOR DETERMINING THE ROTOR ANGLE OF A SYNCHRONOUS MACHINE

(71) Applicant: Robert Bosch GmbH, Stuttgart (DE)

(72) Inventors: Armin Niederer, Karlsruhe-Rueppurr (DE); Gerhard Knecht, Iffezheim (DE); Sebastian Paulus, Esslingen am Neckar (DE); Michael Koerner, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 84 days.

(21) Appl. No.: 14/096,654

(22) Filed: Dec. 4, 2013

(65) Prior Publication Data

US 2014/0152218 A1    Jun. 5, 2014

(30) Foreign Application Priority Data

Dec. 5, 2012  (DE) .......................... 10 2012 222 315

(51) Int. Cl.
 G05B 11/28    (2006.01)
 H02P 6/18    (2006.01)

(52) U.S. Cl.
 CPC ..................................... *H02P 6/187* (2013.01)

(58) Field of Classification Search
 CPC ........... H02P 27/08; H02P 27/06; H02P 2/10; H02P 2207/06; H02P 25/22; H02P 27/085; H02M 7/5395; H02J 7/245
 See application file for complete search history.

(56) References Cited

U.S. PATENT DOCUMENTS

| | | | |
|---|---|---|---|
| 2004/0195995 A1 | 10/2004 | Quirion et al. | |
| 2012/0187894 A1* | 7/2012 | Higuchi et al. | 318/811 |
| 2013/0191006 A1* | 7/2013 | Iseda et al. | 701/102 |

FOREIGN PATENT DOCUMENTS

| | | |
|---|---|---|
| DE | 69701762 | 8/2000 |
| WO | 2009136381 | 11/2009 |

OTHER PUBLICATIONS

Khan et al., "Altered PWM for DC link current translation to phase currents for electric drives," 2012 IEEE 7th International Power Electronics and Motion Control Conference—ECCE Asia, Jun. 2-5, 2012, pp. 2570-2576.

Jenny, F et al., "Steuerverfahren für selbstgeführte Stromrichter" [Control methods for self-commutated converters], Vdf Hochschulverlag AG, 1995, Chapter 8, pp. 152-167.

* cited by examiner

*Primary Examiner* — Karen Masih

(74) *Attorney, Agent, or Firm* — Michael Best & Friedrich LLP

(57) ABSTRACT

A method for determining the rotor angle of a synchronous machine. In one implementation, the method includes generating a multiplicity of pulse-width-modulated drive signals for the phases of an inverter feeding the synchronous machine depending on a voltage to be fed into the synchronous machine, changing the pulse width modulation frequency of at least one drive signal of the multiplicity of pulse-width-modulated drive signals, with the result that the duration of the switching states of the inverter in which an active voltage phasor is output is extended in order to generate a switching pattern for the phases of the inverter, driving the inverter with the generated switching pattern, determining one or more of neutral point potentials at the neutral point of the synchronous machine during driving of the inverter with the switching pattern, and calculating the rotor angle of the synchronous machine depending on the determined neutral point potentials.

9 Claims, 2 Drawing Sheets

CONTROL DEVICE AND METHOD FOR DETERMINING THE ROTOR ANGLE OF A SYNCHRONOUS MACHINE

The invention relates to a control device and a method for determining the rotor angle of a synchronous machine, in particular at low speeds of a synchronous machine of an electric drive system of an electrically operated vehicle.

BACKGROUND

It is expected that, in the future, electronic systems which combine new energy storage technologies with electrical drive technology will be used increasingly both in stationary applications, such as wind energy installations or solar installations, for example, as well as in vehicles, such as hybrid or electric vehicles.

In the regulation of a synchronous machine, for example in an electric drive system of an electrically operated vehicle, knowledge of the relative position of the rotor to the stator of the synchronous machine plays a central role. In order to provide a required torque for a synchronous machine, a rotating electrical field is generated in the stator of the machine which rotates synchronously with the rotor. In order to generate this field, the present angle of the rotor is required for the regulation.

One possibility for determining the rotor angle consists in measuring voltages at the neutral point of the synchronous machine with different phase current constellations in the synchronous machine in order to draw conclusions from this in respect of the present rotor angle.

For example, document WO 2009/136381 A2 discloses a method for determining the rotor angle of a synchronous machine in which, by shifting clock patterns of a pulse-width-modulated phase driving, measurement periods for measuring voltages at the neutral point are optimized.

Document DE 697 01 762 T2 discloses a frequency converter for asynchronous motors which, in order to determine phase currents at a low speed of the motor, replaces individual output voltage vectors of phasor-modulated PWM control signals with a sum of on average equivalent output voltage vectors in order to increase the measurement duration for the phase currents.

Document US 2004/0195995 A1 discloses a phasor modulation method for driving an inverter for a synchronous machine in which PWM drive cycles are modified by extending, in a targeted manner, PWM drive signals for optimizing the rotor position determination.

Chapter 8 in Jenny, F; Wüest, D: "Steuerverfahren für selbstgeführte Stromrichter" [Control methods for self-commutated converters], Vdf Hochschulverlag AG, 1995, pages 152-167 discloses the fundamentals of phasor modulation methods for three-phase voltage generation.

SUMMARY OF THE INVENTION

In accordance with one aspect, the present invention provides a method for determining the rotor angle of a synchronous machine, comprising the steps of generating a multiplicity of pulse-width-modulated drive signals for the phases of an inverter feeding the synchronous machine depending on a voltage to be fed into the synchronous machine, changing the pulse width modulation frequency of at least one drive signal of the multiplicity of pulse-width-modulated drive signals, with the result that the duration of the switching states of the inverter in which an active voltage phasor is output is extended in order to generate a switching pattern for the phases of the inverter, driving the inverter with the generated switching pattern, determining one or more of neutral point potentials at the neutral point of the synchronous machine during driving of the inverter with the switching pattern, and calculating the rotor angle of the synchronous machine depending on the determined neutral point potentials.

In accordance with a further aspect, the present invention provides a control device for determining the rotor angle of a synchronous machine, wherein the control device is designed to implement a method in accordance with one aspect of the invention.

In accordance with a further aspect, the present invention provides an electric drive system with a control device according to the invention, a synchronous machine which is coupled to the control device, and an inverter, which is coupled to the control device and the synchronous machine and which is designed to provide a supply voltage for the synchronous machine, wherein the control device is designed to drive the inverter depending on the determined rotor angle.

One concept of the present invention consists in implementing rotor angle determination without the use of encoders for synchronous machines, in particular at low speeds. In this case, an existing pulse-width-modulated driving (PWM driving) is modified such that, instead of using centered PWM drive signals for the individual stator phases within a PWM pulse period, individual signals of the PWM drive signals are changed with respect to the remaining PWM drive signals. By virtue of a different selection of the drive frequencies of the PWM drive signals corresponding time periods of active voltage phasors can be generated in cyclic sequence, and these time periods are extended in comparison with conventional PWM driving. The selection of the changed frequencies can in this case be changed after each or a plurality of PWM pulse periods between the PWM drive signals in order to produce synchronicity between the PWM drive signals once a specific number of PWM pulse periods have elapsed. Furthermore, frequency ranges for each PWM drive signal can be swept through in a so-called "sweeping" mode.

A considerable advantage of this procedure consists in that no additional voltage or current pulses need to be fed into the synchronous machine in order to determine the rotor angle. Instead, it is advantageously possible to modify PWM drive patterns which are used in any case for driving the synchronous machine in such a way that determination of the rotor angle during running operation of the synchronous machine is possible. In particular at low speeds at which the ratio of the use frequency of zero voltage phasors with respect to active voltage phasors is particularly high, the procedure according to the invention can considerably increase the time period during which voltage phasors suitable for determining the rotor angle are present at the neutral point of the synchronous machine.

In addition, the robustness and reliability of the rotor angle determination is considerably better than known methods which do not use encoders. This enables the use of the rotor angle determination in series-produced vehicles with an electric drive system, for example.

A further advantage consists in that, over the course of the determination procedure, no additional excitations by test voltage pulses are generated, which improves the smooth running of the synchronous machine during operation.

In accordance with one embodiment of the method according to the invention, the synchronous machine can comprise a salient-pole machine or a non-salient-pole machine. Salient-pole machines advantageously have different inductances in the longitudinal and transverse directions, i.e. along the d axis and the q axis, respectively.

In accordance with one embodiment of the method according to the invention, the calculation of the rotor angle can be performed depending on differences in determined neutral point potentials. As a result, faults, temporal fluctuations and measurement inaccuracies can be taken into consideration more effectively.

In accordance with a further embodiment of the method according to the invention, the method can furthermore comprise the steps of changing the pulse width modulation frequency of at least one further drive signal of the multiplicity of pulse-width-modulated drive signals for generating a further switching pattern for the phases of the inverter and selecting one or more of the generated switching patterns for driving the inverter.

In accordance with a further embodiment of the method according to the invention, the generated switching patterns can be selected in cyclic sequence for driving the inverter.

In accordance with a further embodiment of the method according to the invention, the changed pulse width modulation frequencies can be commensurable. Thus, after a predetermined number of PWM drive periods, synchronicity between the individual phases can be again guaranteed.

In accordance with a further embodiment of the method according to the invention, the changed pulse width modulation frequencies can sweep through a frequency range. By this frequency "sweeping", abrupt changes in frequency and thus any associated interference in the phase driving can be avoided.

BRIEF DESCRIPTION OF THE DRAWINGS

Further features and advantages of embodiments of the invention result from the description below relating to the attached drawings.

DETAILED DESCRIPTION

The same reference symbols generally denote identical or functionally identical components. The schematic signal and parameter profiles shown in the figures are only exemplary in nature and have been depicted in idealized form, for reasons of clarity. It goes without saying that in practice different signal and parameter profiles can result owing to different boundary conditions, and that the signal and parameter profiles illustrated merely serve to illustrate principles and functional aspects of the present invention.

Synchronous machines within the meaning of the present invention are electric machines in which a constantly magnetized rotor is driven synchronously by a time-dependent rotating magnetic field in the surrounding stator by virtue of magnetic interaction, with the result that the rotor implements a movement in synchronism with the voltage conditions in the stator, i.e. the speed is dependent, via the pole pair number, on the frequency of the stator voltage. Synchronous machines in the meaning of the present invention can be, for example, AC synchronous machines which are in the form of rotating-armature or stationary-armature machines, for example, which have a rotor and a stator. Furthermore, synchronous machines within the meaning of the present invention can comprise salient-pole machines or non-salient-pole machines. Non-salient-pole machines have an axis-independent inductance of the rotor, while salient-pole machines have a projecting polar axis, also referred to as the d axis, in the direction of which the magnetizing inductance is greater than in the direction of the pole gap, also referred to as the q axis, owing to the smaller air gap. The methods and control devices mentioned below can in principle be used equally for non-salient-pole machines and salient-pole machines unless explicit reference is made below to different discussion of synchronous machine types.

Figure 1:
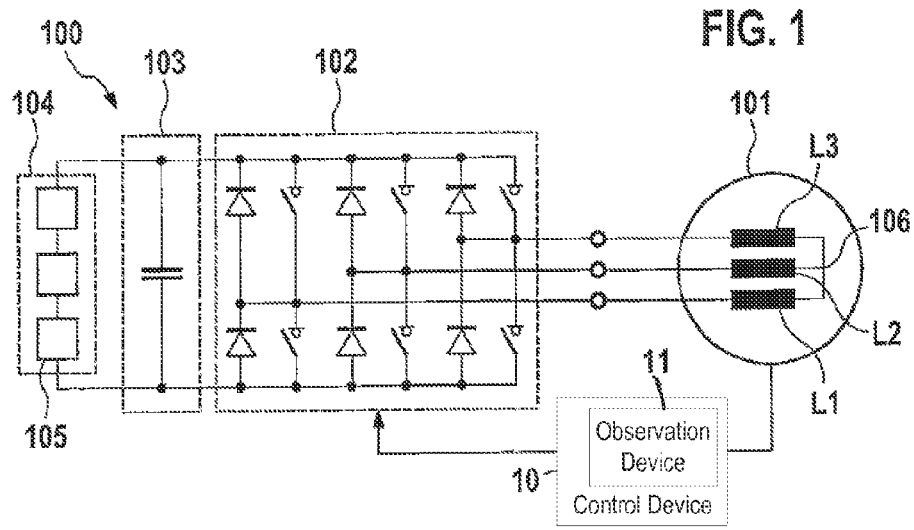
FIG. 1 shows a schematic illustration of an electric drive system comprising a synchronous machine in accordance with an embodiment of the present invention.

FIG. 1 shows a schematic illustration of an electric drive system 100 comprising a synchronous machine 101, into which three-phase alternating current can be fed. In this case, a DC voltage provided by a DC voltage intermediate circuit 103 is converted into a three-phase AC voltage via a converter in the form of a pulse-controlled inverter 102. The DC voltage intermediate circuit 103 is fed by a string 104 of series-connected battery modules 105. In order to be able to meet the requirements set for a respective application in respect of power and energy, a plurality of battery modules 105 are often connected in series in a traction battery 104.

The electric machine 101 can be, for example, a synchronous machine 101, which has stator inductances $L_1$, $L_2$ and $L_3$. By way of example, the synchronous machine 101 is a three-phase synchronous machine. However, it is in principle also possible for a different number of phases to be provided for the synchronous machine. In this case, the regulation of the synchronous machine 101 in the electric drive system plays a central role. In order to provide a required torque for a synchronous machine, a rotating electrical field is generated in the stator of the machine, which rotating electrical field rotates synchronously with the rotor. In order to generate this field, the present angle of the rotor is required for the regulation.

The electric drive system 100 therefore comprises a control device 10, which is coupled to the synchronous machine 101 and which is designed to drive the synchronous machine 101 or regulate its operation. The control device 10 uses the time-dependent rotor angle of the rotor of the synchronous machine 101 with reference to the stator of the synchronous machine 101 for this driving or regulation. The control device 10 can detect electrical operating parameters of the synchronous machine 101. For example, the control device 10 can be designed to determine the voltage at the neutral point 106 of the synchronous machine 101. In order to detect the neutral point voltage, the control device 10 can be connected, for example, to a neutral point connection of the synchronous machine 101 in order to determine the neutral point voltage with respect to a positive or negative reference potential. It may also be possible to determine the neutral point voltage around a neutral point of a parallel-connected network comprising three identical star-connected resistors.

The control device 10 can furthermore have an observation device 11, by means of which the detected neutral point voltage at the neutral point 106 can be further-processed. The observation device 11 can have, for example, a Kalman observer, a Luenberger observer, a Hautus observer or a Gilbert observer for supporting the angle observation. The observation device 11 can generate driving for the pulse-controlled inverter 102 from the detected neutral point voltage. For this, the observation device 11 can be designed to implement Clarke transformations for calculating the rotor angles from the determined voltage values.

With reference to FIGS. 2 to 5, the way in which and with the consideration of which relationships the control device 10 implements determination of the rotor angle β of a synchronous machine 101, in particular at low speeds of the synchronous machine 101, will be explained. Here, the control device 10 can implement in particular the method 20 explained with reference to FIG. 6.

The direct-axis currents $I_d$ and quadrature-axis currents $I_q$ of a permanent magnet synchronous machine have a response which is dependent on the rotor inductance $L_d$ in the polar axis direction and the rotor inductance $L_q$ in the interpolar axis direction and the voltage $U_d$ or $U_q$ present, as follows:

$$dI_d/dt = L_d^{-1} \cdot U_d - R \cdot L_d^{-1} \cdot I_d + L_q \cdot L_d^{-1} \cdot \omega_e \cdot I_q$$

$$dI_q/dt = L_q^{-1} \cdot U_q - R \cdot L_q^{-1} \cdot I_q + L_d \cdot L_q^{-1} \cdot \omega_e \cdot I_d - L_q^{-1} \cdot u_p$$

This applies for the angular velocity $\omega_e$ of the rotor of the synchronous machine, of the resistance R and of the field emf $u_p$. Furthermore, it is assumed that the pole shoe(s) is/are not operated at saturation, i.e. the relationship between the current and the magnetic flux is linear and the respective inductance is not dependent on the current intensity.

Figure 2:
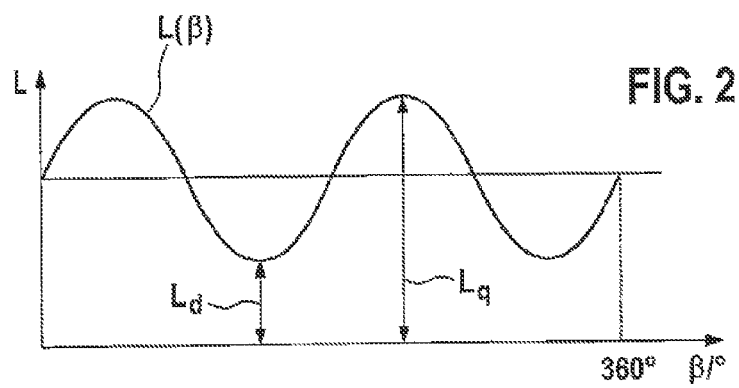
FIG. 2 shows a schematic parameter graph of the angular dependency of the inductance of a synchronous machine on the rotor angle in accordance with a further embodiment of the present invention.

FIG. 2 shows a schematic illustration of the angle dependency L(β) of the inductance on the rotor angle β. Direct-axis and quadrature-axis inductances $L_d$ and $L_q$ in each case occur at the extreme values of the angle-dependent inductance. The rotor angle β is that angle which is enclosed by the q axis with the main stator axis. In this case, the rotor angle β is illustrated over a full rotor revolution, i.e. 360°. Fixing the reference angle of 0° to the negative q-axis direction is in this case only exemplary. It is therefore conceivable to fix the rotor angle β to other reference angles as well.

Therefore, dependent on the voltages U, V and W present on the individual phases, in each case a neutral point voltage $U_s$ which is dependent on the stator inductances $L_1$, $L_2$ and $L_3$ results at the neutral point of the synchronous machine:

$$U_s = (cU + bV + aW)/(a+b+c),$$

wherein $a = L_1 L_2$, $b = L_1 L_3$ and $c = L_2 L_3$. In the text which follows, for reasons of simplicity, the various switching states of the pulse-controlled inverter are shortened with binary three-digit codes. For example, the switching state "100" means that the phase U has been switched to a positive battery potential, whereas the phases V and W have been switched to a negative battery potential. The switching state "011" means, for example, that the phase U has been switched to a negative battery potential, whereas the phases V and W have been switched to a positive battery potential. Six active switching states, i.e. switching states for which a voltage phasor which is different than zero has been activated, therefore result for a three-phase system. Equally, two passive switching states result, i.e. switching states in which a zero voltage phasor has been activated.

In each case three different neutral point voltages can be determined for the switching states 001, 010 and 100, from which neutral point voltages the values for the stator inductances $L_1$, $L_2$ and $L_3$ can be calculated using the abovementioned relationship in a system of linear equations. In order to reduce faults resulting from the induced voltages and useful energization, advantageously also differences between the neutral point voltages can be formed in order to calculate the stator inductances $L_1$, $L_2$ and $L_3$. Similarly, the active switching states 011, 101 and 110 can also be used for calculating the stator inductances $L_1$, $L_2$ and $L_3$.

Alternatively, the measurement of the neutral point voltage can also be in the form of a differential measurement between the neutral point and a neutral point, connected in parallel, comprising three resistors. In turn, a conclusion can be drawn on the stator inductances $L_1$, $L_2$ and $L_3$ via the measurement of the neutral point voltage for the various switching states or the differences thereof. This differential measurement in relation to a resistance neutral point can involve increased measurement accuracy.

The selected measurement method for the determination of the neutral point voltages can be selected according to required quality criteria, efficiency criteria or cost requirements. A further optional improvement of the measurement results can be provided when an additional formation of the difference with the measured neutral point voltage for one or both of the switching states associated with the zero voltage phasors is effected in order to better suppress disruptive influences such as, for example, harmonics of the neutral point voltages.

In any case, conclusions can be drawn on the stator inductances $L_1$, $L_2$ and $L_3$ using the neutral point voltages or the differences between the neutral point voltages. Thus, an indirect conclusion on the rotor angle β is possible.

Figure 3:
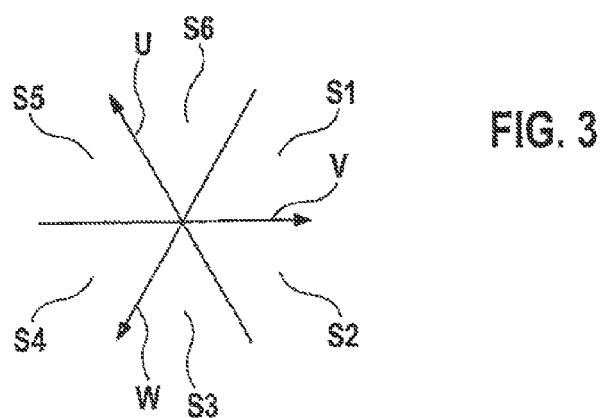
FIG. 3 shows a schematic phasor diagram for the driving of a three-pole synchronous machine in accordance with a further embodiment of the present invention.

FIG. 3 shows a sector diagram for the phasor modulation of a three-phase phasor system. In this case, each voltage can be formed in the six sectors S1 to S6 from a linear combination of two of the basic voltages U, V and W. For example, a voltage in sector S4 can be illustrated by a combination of the switching states 101 and 001, which select the basic voltages U and W or only the basic voltage W. The phase angle of the voltage illustrated is in this case dependent on the ratio of the time periods of the switching states 101 and 001, and the amplitude of the voltage illustrated is dependent on the ratio of the total duration of the switching states 101 and 001 to the duration of the switching states 111 and 000, respectively, i.e. the selection of a zero voltage phasor. Similarly, any desired voltage vectors can be illustrated in all sectors by linear combinations of the basic voltages U, V and W via a selection of appropriate switching state sequences for the pulse-controlled inverter.

Figure 4:
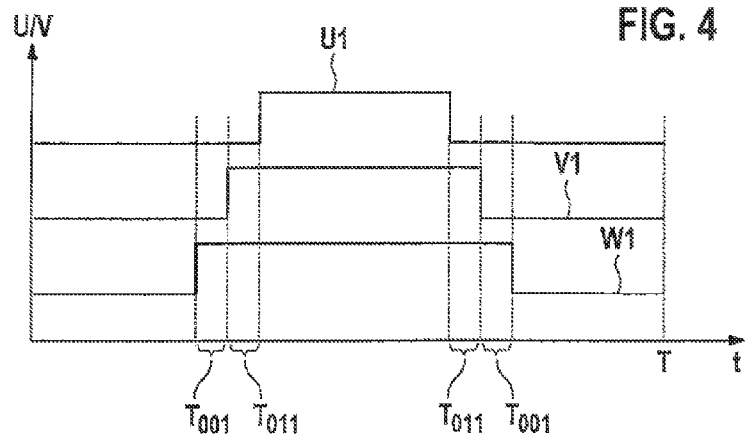
FIG. 4 shows a schematic graph illustrating exemplary PWM drive signals of a synchronous machine.

FIG. 4 shows a schematic graph illustrating exemplary PWM drive signals of a synchronous machine, for example the synchronous machine 101 in FIG. 1. The PWM drive signals U1, V1 and W1 each correspond to the voltages which are applied to the respective phases U, V and W over the course of time. In this case, a high level of the PWM drive signals U1, V1 and W1 in each case corresponds to an application of a positive potential via corresponding driving of the half-bridges of the pulse-controlled inverter to the respective phase, and a low level of the PWM drive signals U1, V1 and W1 in each case corresponds to an application of a negative potential to the respective phase. The PWM drive signals U1, V1 and W1 in FIG. 4 form a centered PWM driving, i.e. the number of switching operations is minimal. Furthermore, in each case only a single switching operation is required when changing over to another switching state. The entire duration of the switching state 001 is $2 \cdot T_{001}$, while the entire duration of the switching state 011 is $2 \cdot T_{011}$. The remaining duration of an entire PWM drive period T is represented in each case by one of the zero voltage phasors by the switching states 000 and 111.

In particular in the case of small voltage vectors to be output, for example in the case of low speeds of the synchronous machine, the ratio between the total duration of the switching states 001 and 011, i.e. $2 \cdot T_{011} + 2 \cdot T_{001}$, to the duration of the total PWM drive period T is likewise small. During the switching states which are illustrated as being only short, it can therefore arise that the potential at the neutral point cannot be determined or cannot be determined to a sufficiently accurate extent.

Figure 5:
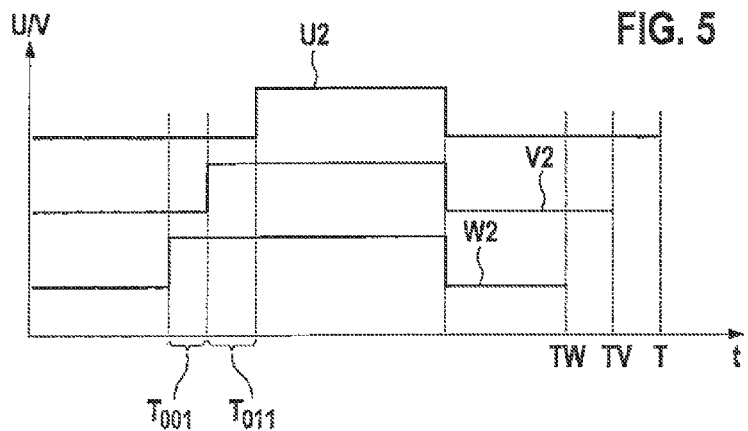
FIG. 5 shows a schematic graph illustrating exemplary PWM drive signals of a synchronous machine in accordance with a further embodiment of the present invention.

Therefore, FIG. 5 shows an alternative possibility for generating PWM drive signals U2, V2 and W2. The PWM drive signals U2, V2 and W2 correspond, given the same voltage vector generation, in the ratio of their high levels to their low levels, to the PWM drive signals U1, V1 and W1 in FIG. 4. However, the pulse modulation frequencies of the PWM drive signals V2 and W2 are changed with respect to the PWM drive signals VI and WI in FIG. 4, with the result that the drive periods TV and TW are shortened with respect to the actual drive period T. Alternatively, the drive periods TV and TW can also be extended with respect to the drive period T. In this case, one or more of the PWM drive signals can be changed in terms of its/their pulse modulation frequencies. For example, different changed pulse modulation frequencies can be selected for different PWM drive signals. For example, the phase U can be clocked at 9 kHz, the phase V at 10 kHz, and the phase W at 11 kHz.

In this case, the ratio of the durations during which switching states are represented by active basic voltage phasors to the durations during which switching states are represented by passive basic voltage phasors, i.e. zero voltage phasors, increases over the course of the drive periods being passed through since the respective high level states of the individual phases appear to still be shifted with respect to one another over the course of time. As a result, mutually suitable time periods can be predetermined depending on the frequency relationships of the pulse modulation frequencies, in which time periods detection of neutral point potentials during the representation of active voltage phasors is possible. The changed pulse modulation frequencies can be selected so as to be commensurable with respect to one another, so that synchronicity between the drive cycles prevails again after a predetermined number of drive period passages.

With this procedure, sufficiently long durations during which a reliable measurement or determination of the neutral point potential in different switching states is possible can be provided at the expense of the number of required switching operations.

The pulse modulation frequencies can be variable. For example, the pulse modulation frequencies can be changed continuously within a frequency sweep, so-called frequency sweeping. Owing to the various possible combinations for changing the pulse modulation frequencies for the different phases, one or more different switching patterns are therefore produced for the PWM drive signals U2, V2 and W2.

After generation of one or more switching patterns, the switching patterns can be used instead of a centered PWM driving in order to have sufficient opportunity for the measurement of the neutral point potentials or the differences in neutral point potentials during the use of the switching patterns. The switching patterns can then be used in any desired order in the sequence of the drive periods for driving the inverter. For example, two switching patterns in alternating sequence can be selected for driving the inverter. In the case of three or more switching patterns, these can be selected in a cyclic sequence for driving the inverter. It may also be possible to use conventional drive periods without changed pulse modulation frequencies between the switching patterns with changed pulse modulation frequencies, with the result that the switching patterns can be selected alternately with respect to the pulse-width-modulated drive signals for driving the inverter. In principle, many different variants for selecting the switching patterns are conceivable for driving the inverter.

Figure 6:
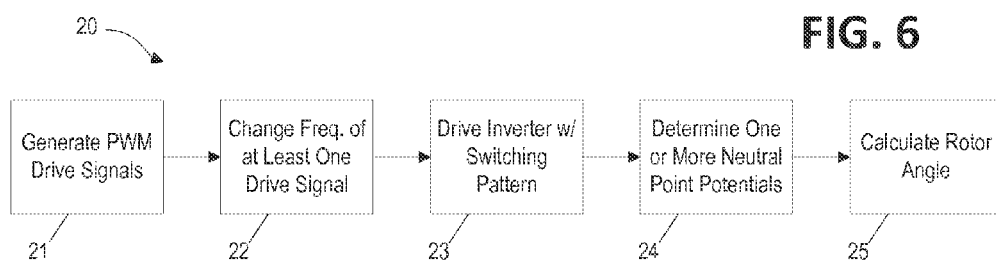
FIG. 6 shows a schematic illustration of a method for determining the rotor angle of a synchronous machine in accordance with a further embodiment of the present invention.

FIG. 6 shows a schematic illustration of a method 20 for determining the rotor angle of a synchronous machine, in particular a synchronous machine 101 as illustrated in FIG. 1 by way of example. In this case, the method 20 can make use of the relationships explained in connection with FIGS. 2 to 5.

In a first step 21, generation of a multiplicity of pulse-width-modulated drive signals for the phases of an inverter feeding the synchronous machine is performed depending on a voltage to be fed into the synchronous machine.

In a second step 22, changing of the pulse width modulation frequency of at least one drive signal of the multiplicity of pulse-width-modulated drive signals is performed, with the result that the duration of the switching states of the inverter in which an active voltage phasor is output is extended for generating a switching pattern for the phases of the inverter. Thereupon, in a third step 23, driving of the inverter with the generated switching pattern can be performed, with the result that, in a step 24, determination of one or more of neutral point potentials at the neutral point of the synchronous machine can be performed during driving of the inverter with the switching pattern. In step 25, the rotor angle of the synchronous machine can then be calculated from this depending on the determined neutral point potentials.

Optionally, changing of the pulse width modulation frequency of at least one further drive signal of the multiplicity of pulse-width-modulated drive signals for generating a further switching pattern for the phases of the inverter can also be performed, which can then be based on a selection of one or more of the generated switching patterns for driving the inverter.

The invention claimed is:

1. A method for determining the rotor angle of a synchronous machine, the method comprising:
generating a multiplicity of pulse-width-modulated drive signals for the phases of an inverter feeding the synchronous machine depending on a voltage to be fed into the synchronous machine;
changing the pulse width modulation frequency of at least one drive signal of the multiplicity of pulse-width-modulated drive signals, with the result that the duration of the switching states of the inverter in which an active voltage phasor is output is extended in order to generate a switching pattern for the phases of the inverter;
driving the inverter with the generated switching pattern;
determining one or more of neutral point potentials at the neutral point of the synchronous machine during driving of the inverter with the switching pattern; and
calculating the rotor angle of the synchronous machine depending on the determined neutral point potentials.

2. The method according to claim 1, wherein the synchronous machine comprises a salient-pole machine or a non-salient-pole machine.

3. The method according to claim 1, wherein the calculation of the rotor angle is performed depending on differences in determined neutral point potentials.

4. The method according to claim 1, further comprising the following steps:
changing the pulse width modulation frequency of at least one further drive signal of the multiplicity of pulse-width-modulated drive signals for generating a further switching pattern for the phases of the inverter; and selecting one or more of the generated switching patterns for driving the inverter.

5. The method according to claim 4, wherein the generated switching patterns are selected in cyclic sequence for driving the inverter.

6. The method according to claim 5, wherein the changed pulse width modulation frequencies are commensurable.

7. The method according to claim 1, wherein the changed pulse width modulation frequency sweeps through a frequency range.

8. A control device for determining the rotor angle of a synchronous machine, wherein the control device is designed to implement a method according to claim 1.

9. An electric drive system, comprising:
a control device according to claim 8;
a synchronous machine coupled to the control device; and
an inverter, which is coupled to the control device and the synchronous machine and which is designed to provide a supply voltage for the synchronous machine, wherein the control device is designed to drive the inverter depending on the determined rotor angle.

* * * * *